United States Patent
Ikeda et al.

(10) Patent No.: US 9,831,504 B2
(45) Date of Patent: Nov. 28, 2017

(54) SINGLE FUEL CELL AND METHOD OF MANUFACTURING SINGLE FUEL CELL

(71) Applicant: TOYOTA JIDOSHA KABUSHIKI KAISHA, Toyota-shi, Aichi-ken (JP)

(72) Inventors: Kotaro Ikeda, Susono (JP); Akito Kawasumi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 92 days.

(21) Appl. No.: 15/057,603

(22) Filed: Mar. 1, 2016

(65) Prior Publication Data
US 2016/0260989 A1 Sep. 8, 2016

(30) Foreign Application Priority Data
Mar. 3, 2015 (JP) .................................. 2015-041707

(51) Int. Cl.
| | |
|---|---|
| H01M 8/1004 | (2016.01) |
| H01M 8/0273 | (2016.01) |
| H01M 8/1007 | (2016.01) |
| H01M 8/0284 | (2016.01) |
| H01M 8/0286 | (2016.01) |
| H01M 8/1018 | (2016.01) |

(52) U.S. Cl.
CPC ....... *H01M 8/0273* (2013.01); *H01M 8/0284* (2013.01); *H01M 8/0286* (2013.01); *H01M 8/1004* (2013.01); *H01M 8/1007* (2016.02); *H01M 2008/1095* (2013.01); *Y02P 70/56* (2015.11)

(58) Field of Classification Search
CPC . H01M 8/1004; H01M 8/0273; H01M 8/0276
See application file for complete search history.

(56) References Cited

FOREIGN PATENT DOCUMENTS

JP 2013-251253 A 12/2013

*Primary Examiner* — Olatunji Godo
(74) *Attorney, Agent, or Firm* — Andrews Kurth Kenyon LLP (57) ABSTRACT

A single fuel cell includes: a membrane electrode assembly; gas diffusion layers 3c and 3a that placed on both side surfaces of the membrane electrode assembly, respectively so that an outer peripheral edge portion remains in one side surface of the membrane electrode assembly; an adhesive layer formed to cover the outer peripheral edge portion; and a support frame fixed on the adhesive layer. The support frame includes: a support frame body made of resin; and coating layers formed to cover both side surfaces of the support frame body, respectively. The support frame is fixed on the adhesive layer so that the support frame is spaced from the gas diffusion layer on the one side surface of the membrane electrode assembly, and the single fuel cell further includes a protecting layer formed to cover an end of the interior portion of the support frame body.

9 Claims, 8 Drawing Sheets

FIG. 17

SINGLE FUEL CELL AND METHOD OF MANUFACTURING SINGLE FUEL CELL

CROSS-REFERENCE TO RELATED APPLICATION

The present application claims priority to Japanese Patent Application No. 2015-041707 filed on Mar. 3, 2015, which is incorporated herein by reference in its entirety.

BACKGROUND OF THE INVENTION

Field of the Invention

The present invention relates to a single fuel cell and to a method for manufacturing a single fuel cell.

Description of the Related Art

There has been known a single fuel cell that includes a membrane electrode assembly having an electrolyte membrane and electrocatalyst layers formed on both side surfaces of the electrolyte membrane, respectively; gas diffusion layers placed on both side surfaces of the membrane electrode assembly, respectively, so that an outer peripheral edge portion remains in one side surface of the membrane electrode assembly; an adhesive layer with thermoplasticity, formed to cover the outer peripheral edge portion; and a support frame fixed on the adhesive layer, wherein the support frame includes: a support frame body made of resin; and coating layers formed to cover both side surfaces of the support frame body; and the support frame is adjacent to the gas diffusion layer on the one side surface of the membrane electrode assembly, or is adjacent to the gas diffusion layer via an elastic adhesive material (see, for example, Patent Literature 1).

CITATION LIST

Patent Literature

[Patent Literature 1] Japanese Laid-open Patent Publication No. 2013-251253

The above-described single fuel cell has a structure in which the support frame is substantially adjacent to the gas diffusion layer on the one side surface of the membrane electrode assembly. In the structure, when the support frame is fixed on the adhesive layer so as to be adjacent to the gas diffusion layer, the support frame and the gas diffusion layer may partially overlap each other due to a dimensional error or a positional deviation, and the adhesive layer may protrude from between the support frame and the gas diffusion layer due to a thickness error. As a candidate for a method for avoiding such situations, a structure in which the support frame is spaced from the gas diffusion layer can be considered. By spacing the support frame from the gas diffusion layer, the dimensional error, the positional deviation, and the thickness error can be absorbed due to a gap formed between the support frame and the gas diffusion layer. In such a case, an end of the support frame body, which is not covered with the coating layers, in the support frame is exposed to the gap. However, water generated in the single fuel cell easily collects in the gap, the generated water is strongly acidic, and therefore, the end of the support frame body is exposed to the strongly acidic generated water. As a result, degradation of the support frame body may occur, such as a decrease in strength due to hydrolysis of part of the support frame body by the generated water depending on the resin. Preventing the support frame body from degrading even in the structure in which the support frame is spaced from the gas diffusion layer is desired.

SUMMARY OF THE INVENTION

In accordance with an aspect of the present invention, there is provided a single fuel cell, comprising: a membrane electrode assembly including an electrolyte membrane and electrocatalyst layers formed on both side surfaces of the electrolyte membrane, respectively; gas diffusion layers placed on both side surfaces of the membrane electrode assembly, respectively, so that an outer peripheral edge portion remains in one side surface of the membrane electrode assembly; an adhesive layer formed to cover the outer peripheral edge portion; and a support frame fixed on the adhesive layer, wherein the support frame comprises: a support frame body made of resin; and coating layers formed to cover both side surfaces of the support frame body, respectively; the support frame is fixed on the adhesive layer so that the support frame is spaced from the gas diffusion layer on the one side surface of the membrane electrode assembly; and the single fuel cell further comprises a protecting layer formed to cover an end of an interior portion of the support frame body.

In accordance with another aspect of the present invention, there is provided a method of manufacturing a single fuel cell, the single fuel cell comprising: a membrane electrode assembly including an electrolyte membrane and electrocatalyst layers formed on both side surfaces of the electrolyte membrane, respectively; gas diffusion layers placed on both side surfaces of the membrane electrode assembly, respectively; and a support frame supporting the membrane electrode assembly on a periphery of the membrane electrode assembly, wherein the support frame comprises: a support frame body made of resin; and coating layers formed to cover both side surfaces of the support frame body, respectively; the method of manufacturing the single fuel cell, comprising: providing the membrane electrode assembly in which the gas diffusion layers are placed so that an outer peripheral edge portion remains in one side surface of the membrane electrode assembly; forming an adhesive layer on the outer peripheral edge portion; placing the support frame, in which an end of an interior portion of the support frame body is exposed, on the adhesive layer so that the support frame is spaced from the gas diffusion layer on the one side surface of the membrane electrode assembly; relatively pressing the support frame on the adhesive layer; and curing the adhesive layer, wherein in the step of relatively pressing the support frame on the adhesive layer, the end of the interior portion of the support frame body is covered with a part of the adhesive layer, whereby a protecting layer is formed.

A support frame body can be prevented from degrading even in a structure in which a support frame is spaced from a gas diffusion layer.

DETAILED DESCRIPTION OF THE PREFERRED EMBODIMENTS

Figure 1:
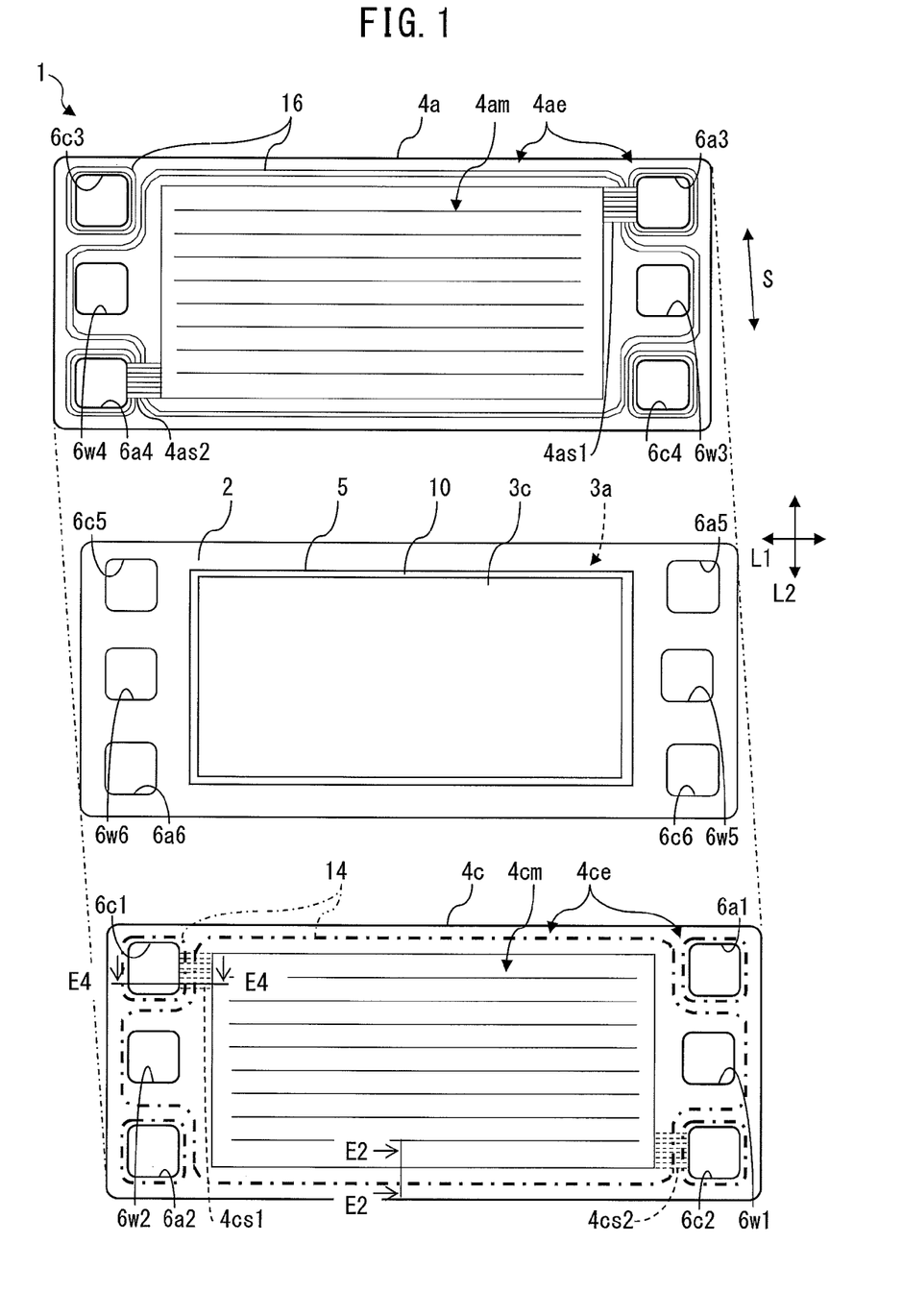
FIG. 1 is an exploded perspective view schematically illustrating a configuration example of a single fuel cell.

The configuration of a single fuel cell will be described. FIG. 1 is an exploded perspective view schematically illustrating a configuration example of the single fuel cell. The single fuel cell 1 includes a membrane electrode assembly 5. A cathode gas diffusion layer 3c and an anode gas diffusion layer 3a are placed on both side surfaces of the membrane electrode assembly 5, respectively, and a support frame 2 is placed on the periphery of the membrane electrode assembly 5 via an adhesive layer 10. A cathode separator 4c and an anode separator 4a are placed on both side surfaces of the membrane electrode assembly 5 and the support frame 2, respectively. Thus, the single fuel cell 1 is formed by assembling the cathode separator 4c and the anode separator 4a onto the both side surfaces of the support frame 2 and the membrane electrode assembly 5 including the gas diffusion layers 3c and 3a, respectively. When viewed from the thickness direction S of the single fuel cell 1, the single fuel cell 1 has an approximately rectangular outer shape having a longitudinal direction L1 and a transverse direction L2 perpendicular to the longitudinal direction L1. Similarly, each member of the membrane electrode assembly 5, the support frame 2, each of the gas diffusion layers 3c and 3a, and each of the separators 4c and 4a, included in the single fuel cell 1, also has an approximately rectangular outer shape. Thus, the longitudinal direction and transverse direction of each member correspond to the longitudinal direction L1 and transverse direction L2 of the single fuel cell 1, respectively. Hereinafter, the longitudinal direction and transverse direction of each member are also referred to as the longitudinal direction L1 and transverse direction L2, respectively.

A central portion 4cm of the cathode separator 4c includes plural grooves for oxidant gas feed passages in the membrane electrode assembly 5 side (the side which is not illustrated in the drawing). The plural grooves of the central portion 4cm are formed by integrally molding the cathode separator 4c. In the embodiment illustrated in FIG. 1, the grooves of the central portion 4cm are unidirectional flow passages. In another embodiment which is not illustrated, the plural grooves are serpentine-type flow passages. In a peripheral portion 4ce in the outside of the central portion 4cm in the cathode separator 4c, in the vicinities of both end portions in the longitudinal direction L1 of the cathode separator 4c, penetration ports 6c1 and 6c2 for an oxidant gas manifold, penetration ports 6w1 and 6w2 for a cooling water manifold, and penetration ports 6a1 and 6a2 for a fuel gas manifold are formed to penetrate the cathode separator 4c. Flow passage members 4cs1 and 4cs2 through which oxidant gas is guided are placed between the penetration ports 6c1 and 6c2 for an oxidant gas manifold and the plural grooves of the central portion 4cm. In another embodiment which is not illustrated, the flow passage members 4cs1 and 4cs2 are formed as parts of the cathode separator 4c by integral molding. In the side, reverse to the membrane electrode assembly 5 of the peripheral portion 4ce (the side illustrated in the drawing), flat surfaces on which gasket-like sealing members 14 can be placed are formed around each penetration port and around the central portion 4cm.

A central portion 4am of the anode separator 4a includes plural grooves for fuel gas feed passages in the membrane electrode assembly 5 side (the side illustrated in the drawing). The plural grooves of the central portion 4am are formed by integrally molding the anode separator 4a. In the embodiment illustrated in FIG. 1, the plural grooves of the central portion 4am are unidirectional flow passages. In another embodiment which is not illustrated, the plural grooves are serpentine-type flow passages. In a peripheral portion 4ae in the outside of the central portion 4am in the anode separator 4a, in the vicinities of both end portions in the longitudinal direction L1 of the anode separator 4a, penetration ports 6c3 and 6c4 for an oxidant gas manifold, penetration ports 6w3 and 6w4 for a cooling water manifold, and penetration ports 6a3 and 6a4 for a fuel gas manifold are formed to penetrate the anode separator 4a. Flow passage members 4as1 and 4as2 through which fuel gas is guided are placed between the penetration ports 6a3 and 6a4 for a fuel gas manifold and the plural grooves of the central portion 4am. In another embodiment which is not illustrated, the flow passage members 4as1 and 4as2 are formed as parts of the anode separator 4a by integral molding. In the side reverse to the membrane electrode assembly 5 of the peripheral portion 4ae (the side which is not illustrated), depressions for receiving the sealing members 14 are formed around each penetration port and around the central portion 4am, and protrusions 16 are formed at corresponding positions in the membrane electrode assembly 5 side.

In the vicinities of both end portions in the longitudinal direction L1 of the support frame 2, penetration ports 6c5 and 6c6 for an oxidant gas manifold, penetration ports 6w5 and 6w6 for a cooling water manifold, and penetration ports 6a5 and 6a6 for a fuel gas manifold are formed to penetrate the support frame 2.

When the single fuel cell 1 is formed, the penetration ports 6c1, 6c5, 6c3, 6c2, 6c6, and 6c4 for an oxidant gas manifold, the penetration ports 6w1, 6w5, 6w3, 6w2, 6w6, and 6w4 for a cooling water manifold, and the penetration ports 6a1, 6a5, 6a3, 6a2, 6a6, and 6a4 for a fuel gas manifold in the cathode separator 4c, the support frame 2, and the anode separator 4a are correspondingly aligned in the thickness direction S by assembling the cathode separator 4c and the anode separator 4a on the both sides of the membrane electrode assembly 5 supported by the support frame 2. Thus, passages extending in the thickness direction S, i.e., oxidant gas manifolds, cooling water manifolds, and fuel gas manifolds as fluid flow-through passages are defined.

Figure 2:
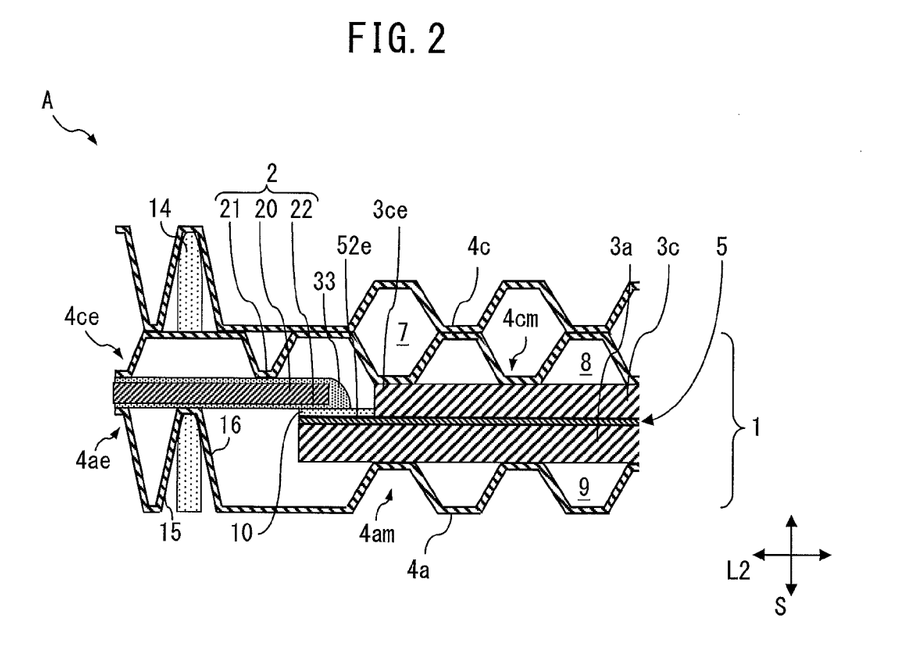
FIG. 2 is a partial cross-sectional view illustrating a configuration example of a fuel cell stack including a single fuel cell.
Figure 3:
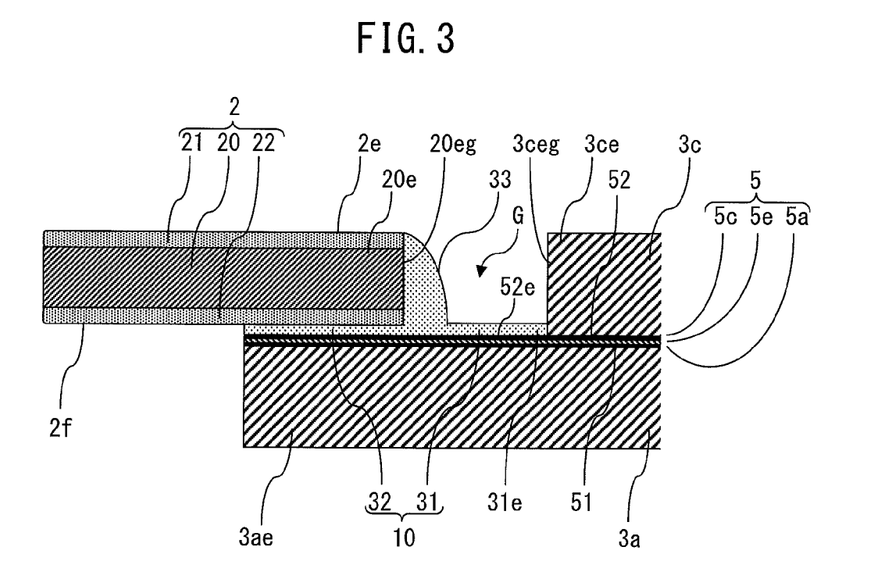
FIG. 3 is a partially enlarged view of FIG. 2.

FIG. 2 is a partial cross-sectional view illustrating a configuration example of a fuel cell stack A including a single fuel cell 1. The drawing illustrates a portion corresponding to a cross section taken along the line E2-E2 of FIG. 1. FIG. 3 is a partially enlarged view of FIG. 2. A fuel cell stack A is formed by a layered product in which a plurality of single fuel cells 1 are layered in the thickness direction S of the single fuel cell 1. The single fuel cell 1 generates electric power by the electrochemical reaction of fuel gas (e.g., hydrogen gas) and oxidant gas (e.g., air). The electric power generated by the single fuel cell 1 is taken to the outside of the fuel cell stack A via a plurality of wiring lines from terminal plates placed on both end portions of the layered product to the outside of the fuel cell stack A. The electric power taken from the fuel cell stack A is fed to, for example, an electric motor for driving an electrically driven vehicle, or a capacitor.

The membrane electrode assembly 5 of the single fuel cell 1 includes an electrolyte membrane 5e as well as a cathode electrocatalyst layer 5c and an anode electrocatalyst layer 5a that are formed on both sides of the electrolyte membrane 5e. The electrolyte membrane 5e, the cathode electrocatalyst layer 5c, and the anode electrocatalyst layer 5a have similar sizes. When the cathode electrocatalyst layer 5c and the anode electrocatalyst layer 5a are placed on the both sides of the electrolyte membrane 5e to form the membrane electrode assembly 5, the electrolyte membrane 5e, the cathode electrocatalyst layer 5c, and the anode electrocatalyst layer 5a almost fit each other. In another embodiment which is not illustrated, at least one of the cathode electrocatalyst layer 5c and the anode electrocatalyst layer 5a is smaller than the electrolyte membrane 5e.

Examples of the material of the electrolyte membrane 5e include a fluorine-based polymer membrane with ionic conductivity. In the embodiment illustrated in FIG. 2, an ion exchange membrane with proton conductivity including perfluorosulfonic acid is used. Examples of the materials of the cathode electrocatalyst layer 5c and the anode electrocatalyst layer 5a include catalyst-supported carbon on which a catalyst such as platinum or platinum alloy is supported. In the embodiment illustrated in FIG. 2, catalyst-supported carbon on which platinum alloy is supported is used. In another embodiment which is not illustrated, an ionomer of the same material as that of the electrolyte membrane 5e is further added to the catalyst-supported carbon.

A cathode gas diffusion layer 3c is placed on one side surface 52 of the membrane electrode assembly 5, i.e., on the cathode electrocatalyst layer 5c, to thereby electrically connect the cathode gas diffusion layer 3c to the membrane electrode assembly 5. In addition, an anode gas diffusion layer 3a is placed on the other side surface 51 of the membrane electrode assembly 5, i.e., on the anode electrocatalyst layer 5a, to thereby electrically connect the anode gas diffusion layer 3a to the membrane electrode assembly 5. The cathode gas diffusion layer 3c has the next smaller size than that of the membrane electrode assembly 5. When the cathode gas diffusion layer 3c is placed on the one side surface 52 of the membrane electrode assembly 5, an outer peripheral edge portion 52e is formed in a frame shape on the one side surface 52 of the membrane electrode assembly 5 around the cathode gas diffusion layer 3c. In contrast, the anode gas diffusion layer 3a has a size similar to that of the membrane electrode assembly 5. When the anode gas diffusion layer 3a is placed on the other side surface 51 of the membrane electrode assembly 5, the membrane electrode assembly 5 and the anode gas diffusion layer 3a almost fit each other.

Examples of the materials of the cathode gas diffusion layer 3c and the anode gas diffusion layer 3a include porous bodies with conductivity, e.g., carbon porous bodies such as carbon papers, carbon cloths, and glasslike carbons, and metal porous bodies such as metal meshes and foam metals. In the embodiment illustrated in FIG. 2, carbon cloth is used. In another embodiment which is not illustrated, the above-described porous body is impregnated with a material with high water repellency such as polytetrafluoroethylene in such a manner that porosity is not lost. In still another embodiment which is not illustrated, a mixed layer of a material with high water repellency and carbon particles is formed on a side surface of the above-described porous body.

An adhesive layer 10 is formed on the outer peripheral edge portion 52e. The adhesive layer 10 is formed in a frame shape that is similar to that of the outer peripheral edge portion 52e. In the embodiment illustrated in FIG. 2, the adhesive layer 10 is formed on the whole surface of the outer peripheral edge portion 52e to cover the outer peripheral edge portion 52e. The adhesive layer 10 includes: an outer portion 32 located on the outside of the outer peripheral edge portion 52e in a planar direction; and an interior portion 31 located on the inside of the outer peripheral edge portion 52e in the planar direction. An end portion 31e in the inside of the interior portion 31 comes in contact with an outer portion 3ce of the cathode gas diffusion layer 3c.

The adhesive layer 10 is formed of an adhesive that does not have any thermosetting property but has ultraviolet (UV) curability. Examples of the material of such an adhesive layer 10 include: UV curable adhesives in which radical-polymerizable resins such as UV curable polyisobutylene resin, UV curable epoxy resin, and UV curable acrylic resin are used; and UV curable adhesives in which cationic polymerizable resins are used. In the embodiment illustrated in FIG. 2, a UV curable adhesive in which UV curable polyisobutylene resin which is a radical-polymerizable resin is used is used. Examples of a method of applying an adhesive for the adhesive layer 10 include a screen printing method and an application method with a dispenser. In the embodiment illustrated in FIG. 2, a screen printing method is used.

A support frame 2 is placed on the adhesive layer 10. The support frame 2, which has a frame shape, supports the membrane electrode assembly 5 including the cathode gas diffusion layer 3c and the anode gas diffusion layer 3a on the periphery of the membrane electrode assembly 5. In the embodiment illustrated in FIG. 3, an interior portion 2e which is one side surface of the support frame 2 is adhered onto the outer portion 32 of the adhesive layer 10, whereby the interior portion 2e of the support frame 2 is adhered to the outer peripheral edge portion 52e of the membrane electrode assembly 5. When the interior portion 2e is adhered to the outer peripheral edge portion 52e, a gap G is formed between the interior portion 2e of the support frame 2 and the outer portion 3ce of the cathode gas diffusion layer 3c. In other words, the support frame 2 is placed to be spaced from the cathode gas diffusion layer 3c.

The support frame 2 includes: a support frame body 20; and adhesive coating layers 21 and 22 that are formed on both side surfaces of the support frame body 20, respectively. The adhesive coating layers 21 and 22 can be regarded as coating layers that coat both side surfaces of the support frame body 20.

The support frame body 20 is formed of a material with an electrical insulation property and airtightness. A crystalline polymer is used as the material of the support frame body 20. Examples of the crystalline polymer include engineering plastics. Examples of the engineering plastics include polyethylene naphthalate resin (PEN) and polyethylene terephthalate resin (PET). In the embodiment illustrated in FIG. 3, polyethylene terephthalate resin which can transmit ultraviolet rays having predetermined wavelengths (e.g., 365 nm) used for curing the adhesive layer 10 is used as the material of the support frame body 20.

The adhesive coating layers 21 and 22 can be adhered to the support frame body 20, a cathode separator 4c, an anode separator 4a, and the adhesive layer 10, and are formed of an adhesive having thermoplasticity. The materials of the adhesive coating layers 21 and 22 can be selected as appropriate from, for example, vinyl acetate resin adhesives, polyvinyl alcohol resin adhesives, ethylene-vinyl acetate resin adhesives, vinyl chloride resin adhesives, acrylic resin adhesives, polyamide resin adhesives, cellulosic resin adhesives, polyvinylpyrrolidone resin adhesives, polystyrene resin adhesives, cyanoacrylate resin adhesives, polyvinyl acetal resin adhesives, polyester resin adhesives, modified olefin resin adhesives, and the like, depending on the materials of the support frame body 20, both of the separators 4c and 4a, and the adhesive layer 10.

In the embodiment illustrated in FIG. 3, a structure in which the support frame 2 is spaced from the cathode gas diffusion layer 3c to form the gap G is adopted. Because the gap G has a recessed shape, water generated in the single fuel cell 1 easily collects in the gap G. The generated water becomes acidic due to sulfonic acid and/or the like eluted from the electrolyte membrane 5e, and can be concentrated to become strongly acidic because of remaining in the gap G for a long time. Thus, when the end 20eg of the interior portion 20e of the support frame body 20 that is coated with neither of the adhesive coating layers 21 and 22 is exposed to the gap G, the end 20eg is exposed to the strongly acidic generated water. In such a case, when a material vulnerable to a strong acidic atmosphere such as an atmosphere in which the generated water described above is present, e.g., polyethylene terephthalate resin or polyethylene naphthalate resin, is used as the material of the support frame body 20, the strength of the support frame body 20 may be decreased, e.g., due to hydrolysis of part of the support frame body 20.

Thus, in the embodiment illustrated in FIG. 3, a protecting layer that protects the end 20eg from a strongly acidic atmosphere, i.e., an adhesive protecting layer 33 is formed on the end 20eg of the support frame body 20, while a polyethylene terephthalate resin material that is vulnerable to a strongly acidic atmosphere is used as the material of the support frame body 20. The material of the adhesive protecting layer 33 is not particularly limited as long as being a material that can protect the end 20eg from a strongly acidic atmosphere. Examples of the material include the same material as that of the adhesive layer 10, and the same material as that of the adhesive coating layers 21 and 22. Thus, the support frame body 20 is prevented from being exposed to a strongly acidic atmosphere, and the strength of the support frame body 20 can be prevented from decreasing. Both of the side surfaces of the support frame body 20 are not degraded by the strongly acidic atmosphere of the single fuel cell 1 because of being protected by the adhesive coating layers 21 and 22, respectively. The adhesive protecting layer 33 does not completely cover the gap G, and the support frame 2 and the cathode gas diffusion layer 3c are not adjacent to each other via the adhesive protecting layer 33. In other words, the gap G remains between the adhesive protecting layer 33 and an end 3ceg of the outer portion ace of the cathode gas diffusion layer 3c. Therefore, it can be checked from a gap G side whether the adhesive protecting layer 33 appropriately covers the end 20eg of the support frame body 20.

The peripheral portion 4ce in one side surface of the cathode separator 4c is adhered and fixed to the other side surface of the support frame 2 with the adhesive coating layer 21. The central portion 4cm which is more interior than the peripheral portion 4ce in the one side surface of the cathode separator 4c abuts on the cathode gas diffusion layer 3c, whereby the cathode separator 4c is electrically connected to the cathode gas diffusion layer 3c. The adhesive coating layer 21 seals a cathode electrode side of the single fuel cell 1 from the outside. As illustrated in FIG. 2, plural oxidant gas feed passages 8 are formed by plural grooves for oxidant gas feed passages disposed in the central portion 4cm of the cathode separator 4c and by the cathode gas diffusion layer 3c. Oxidant gas fed from the plural oxidant gas feed passages 8 are fed to the membrane electrode assembly 5 through the cathode gas diffusion layer 3c.

In contrast, the peripheral portion 4ae in one side surface of the anode separator 4a is adhered and fixed to one side surface of the support frame 2 with the adhesive coating layer 22. The central portion 4am which is more interior than the peripheral portion 4ae in the one side surface of the anode separator 4a abuts on the anode gas diffusion layer 3a, whereby the anode separator 4a is electrically connected to the anode gas diffusion layer 3a. The adhesive coating layer 22 seals an anode electrode side of the single fuel cell 1 from the outside. As illustrated in FIG. 2, plural fuel gas feed passages 9 are formed by plural grooves for fuel gas feed passages disposed in the central portion 4am of the anode separator 4a and by the anode gas diffusion layer 3a. Fuel gas fed from the plural fuel gas feed passages 9 are fed to the membrane electrode assembly 5 through the anode gas diffusion layer 3a.

In two single fuel cells 1 adjacent to each other, the cathode separator 4c of one single fuel cell 1 and the anode separator 4a of the other single fuel cell 1 abut on each other. As a result, a cooling water feed passage 7 surrounded by two oxidant gas feed passages 8 and two fuel gas feed passages 9 is formed as illustrated in FIG. 2.

The cathode separator 4c and the anode separator 4a, which do not transmit oxidant gas, fuel gas, or cooling water, are formed of a material with conductivity. Examples of the materials of the cathode separator 4c and the anode separator 4a include metals such as stainless steel and titanium. The linear expansion coefficients of the materials are almost about $10 \times 10^{-6}/°$ C. Specifically, for example, the linear expansion coefficient of SUS304 is about $17 \times 10^{-6}/°$ C. while the linear expansion coefficient of titanium is about $8.4 \times 10^{-6}/°$ C.

In single fuel cells 1 adjacent to each other, the peripheral portion 4ae in the other side surface of the anode separator 4a of one single fuel cell 1 and the peripheral portion 4ce in the other side surface of the cathode separator 4c of the other single fuel cell 1 come into contact with each other via a sealing member 14 as illustrated in FIG. 2. In the embodiment illustrated in FIG. 2, the sealing member 14 placed on a flat surface of the peripheral portion 4ce fits into a depression 15 of the peripheral portion 4ae. Examples of the material of the sealing member 14 include elastic members such as rubber.

In the embodiment illustrated in FIG. 2, the support frame body 20 is further formed of a material having a linear expansion coefficient approximating each linear expansion coefficient of the cathode separator 4c and the anode separator 4a. When the support frame 2 is heated to melt the adhesive coating layers 21 and 22 and to adhere the support frame 2 and both of the separators 4c and 4a to each other, a great difference between the linear expansion coefficient of the support frame body 20 and each linear expansion coefficient of both of the separators 4c and 4a results in a great difference between the shrinkage of the support frame 2 and the shrinkage of both of the separators 4c and 4a in a subsequent cooling process or during cold operation. Then, the support frame 2 applies a large tensile load to the membrane electrode assembly 5, and cracks may be generated, for example, in the vicinity of the outer peripheral edge portion 52e of the electrolyte membrane 5e, or the like, and may cause cross leakage. A reduced difference between the linear expansion coefficient of the support frame body 20 and each linear expansion coefficient of both of the separators 4c and 4a can allow such a situation to be avoided.

Examples of the material of the support frame body 20 having a linear expansion coefficient approximating each linear expansion coefficient of both of the separators 4c and 4a include the above-described crystalline polymer which is biaxially stretched. In the embodiment illustrated in FIG. 2, biaxially-stretched polyethylene terephthalate resin is used as the material of the support frame body 20. The linear expansion coefficient of such a material before stretching is, for example, almost about $100 \times 10^{-6}/°$ C., while the linear expansion coefficient thereof in a stretching direction after the stretching can be lowered, for example, to almost about 20 to $40 \times 10^{x6}/°$ C., by the stretching. In contrast, the linear expansion coefficient of the typical material of the cathode separator 4c or the anode separator 4a is almost about $10 \times 10^{x6}/°$ C. By stretching the support frame 2 in such a manner, the linear expansion coefficient of the support frame 2 in a stretching direction can be allowed to approach each linear expansion coefficient of both of the separators 4a and 4c, and can be adjusted approximately equivalently to each linear expansion coefficient of both of the separators 4a and 4c depending on the degree of the stretching. In another embodiment which is not illustrated, the above-described crystalline polymer which is monoaxially or tri- or more multi-axially stretched, e.g., polyethylene terephthalate resin, is used.

In particular, in the embodiment illustrated in FIG. 2, polyethylene terephthalate resin that is biaxially stretched in directions perpendicular to each other is used as the material of the support frame body 20, and the biaxial stretching directions are aligned in the longitudinal direction L1 and transverse direction L2 of the support frame 2, respectively.

Figure 4:
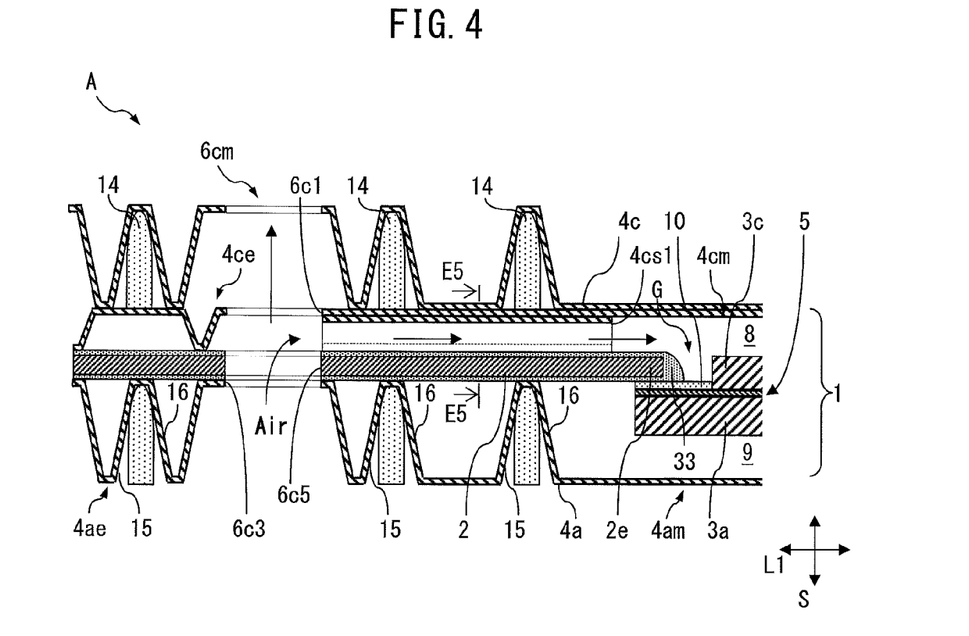
FIG. 4 is a partial cross-sectional view illustrating a configuration example of a fuel cell stack including a single fuel cell.
Figure 5:
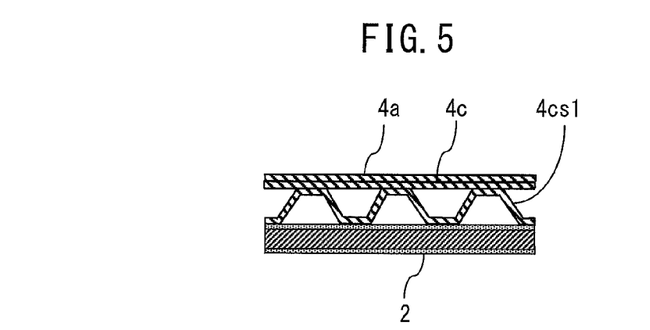
FIG. 5 is a partial cross-sectional view illustrating a configuration example of a flow passage member.

FIG. 4 is a partial cross-sectional view illustrating a configuration example of a fuel cell stack A including a single fuel cell 1. The drawing illustrates the cross section of a part corresponding to a cross section taken along the line E4-E4 of FIG. 1. Referring to FIG. 4, the flow passage member 4cs1 through which oxidant gas is circulated is placed between the support frame 2 and the cathode separator 4c. The flow passage member 4cs1 forms flow passages for oxidant gas between an oxidant gas manifold 6cm formed by aligning penetration ports 6c1, 6c5, and 6c3 for oxidant gas manifolds in a thickness direction S and plural oxidant gas feed passages 8 in the central portion 4cm of the cathode separator 4c. Similarly, the flow passage member 4cs2 through which oxidant gas is circulated (see FIG. 1) is placed between the support frame 2 and the cathode separator 4c. The flow passage member 4cs2 forms flow passages for oxidant gas between another oxidant gas manifold formed by aligning penetration ports 6c2, 6c6, and 6c4 for oxidant gas manifolds in the thickness direction S and the plural oxidant gas feed passages 8. FIG. 5 illustrates a cross section taken along the line E5-E5 of FIG. 4. In the embodiment illustrated in FIG. 5, the cross section of the flow passage member 4cs1 in a flow passage direction has a shape having a plurality of grooves parallel to the flow passage direction, similarly with the oxidant gas feed passages 8. In the embodiment illustrated in FIG. 1, the shapes of the flow passage members 4cs2, 4as1, and 4as2 are similar to the shape of the flow passage member 4cs1.

The gap G is present on the periphery of the cathode gas diffusion layer 3c. As illustrated in FIG. 4, the gap G between the flow passage member 4cs1 and the oxidant gas feed passage 8 is in a flow passage for oxidant gas, and therefore, water generated in the single fuel cell 1 easily collects in the gap G. Similarly, although illustration is omitted, water generated in the single fuel cell 1 easily collects in a gap G between the oxidant gas feed passage 8 and the flow passage member 4cs2, placed on the opposite side of the cathode gas diffusion layer 3c. Such types of generated water, which are acidic, can be concentrated and can become strongly acidic when remaining in each gap G for a long time. However, because the adhesive protecting layer 33 is formed on the end 20eg of the support frame body 20, the end 20eg is protected from strongly acidic generated water and/or the like.

Next, a method of manufacturing a single fuel cell will be described. FIG. 6 to FIG. 13 are partial cross-sectional views illustrating each step of the method of manufacturing a single fuel cell 1.

Figure 6:
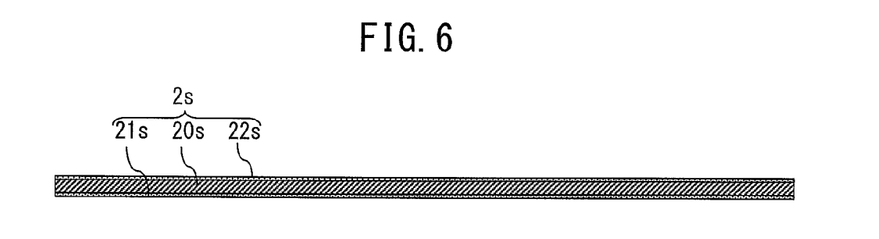
FIG. 6 is a partial cross-sectional view illustrating steps of a method of manufacturing a single fuel cell.

First, as illustrated in FIG. 6, a sheet 2s for a support frame is provided as the material of the support frame 2. The sheet 2s for a support frame includes: a support frame body 20s; and adhesive coating layers 21s and 22s on both side surfaces of the support frame body 20s, respectively. In the embodiment illustrated in FIG. 6, polyethylene terephthalate resin is used as the material of the support frame body 20s, i.e., as the material of the support frame body 20. The support frame body 20s is biaxially stretched in advance in stretching directions perpendicular to each other.

Figure 7:
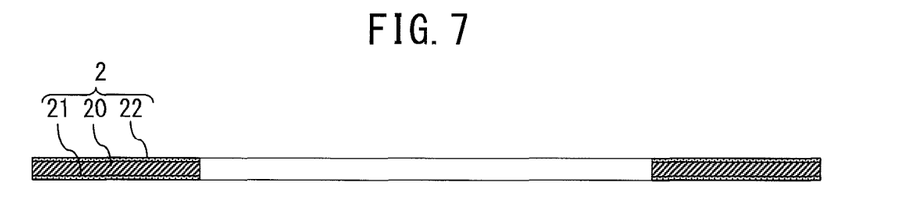
FIG. 7 is a partial cross-sectional view illustrating the steps of the method of manufacturing a single fuel cell.

Then, as illustrated in FIG. 7, the sheet 2s for a support frame is cut into a frame shape, to form the support frame 2. In such a case, the sheet 2s for a support frame is cut so that the biaxial stretching directions of the support frame body 20s are aligned in the longitudinal direction L1 and transverse direction L2 of the support frame 2, respectively. The support frame body 20s and the adhesive coating layers 21s and 22s becomes the support frame body 20 and adhesive coating layers 21 and 22. In another embodiment which is not illustrated, the sheet 2s for a support frame is cut so that the biaxial stretching directions of the support frame body 20s intersect with the longitudinal direction L1 and transverse direction L2 of the support frame 2, respectively.

Figure 8:
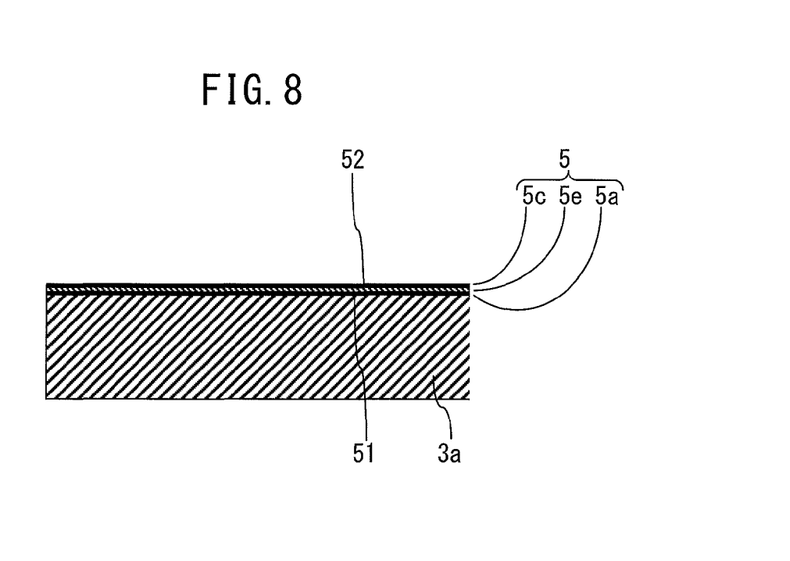
FIG. 8 is a partial cross-sectional view illustrating the steps of the method of manufacturing a single fuel cell.

Subsequently, as illustrated in FIG. 8, the membrane electrode assembly 5 in which the anode gas diffusion layer 3a is placed on the other side surface 51 and the one side surface 52 is exposed is provided. The anode gas diffusion layer 3a and the membrane electrode assembly 5 are joined to each other in advance by heating and compressing the anode gas diffusion layer 3a and the membrane electrode assembly 5, e.g., by a hot pressing step.

Figure 9:
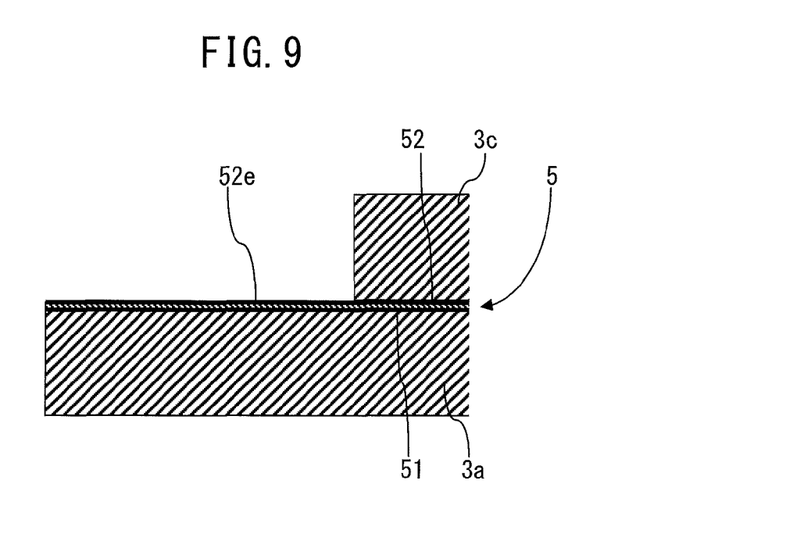
FIG. 9 is a partial cross-sectional view illustrating the steps of the method of manufacturing a single fuel cell.

Next, as illustrated in FIG. 9, the cathode gas diffusion layer 3c is placed on the one side surface 52 of the membrane electrode assembly 5 so that the outer peripheral edge portion 52e remains. Then, the cathode gas diffusion layer 3c and the membrane electrode assembly 5 are joined to each other by heating and compressing the cathode gas diffusion layer 3c and the membrane electrode assembly 5, e.g., by a hot pressing step.

Figure 10:
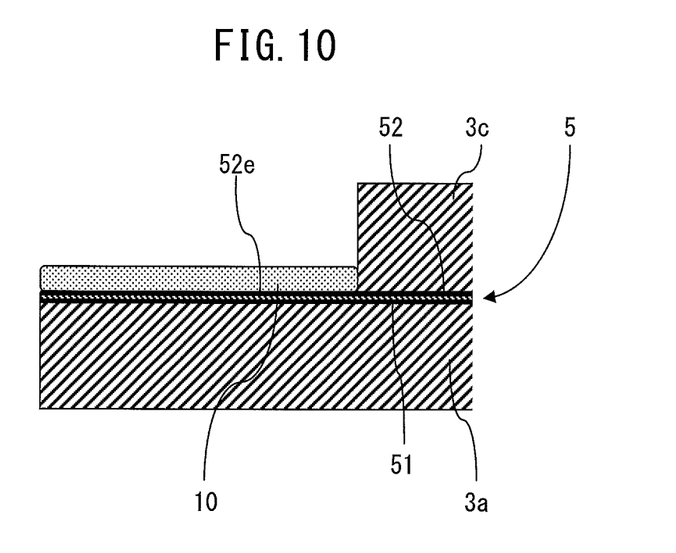
FIG. 10 is a partial cross-sectional view illustrating the steps of the method of manufacturing a single fuel cell.

Next, as illustrated in FIG. 10, the adhesive layer 10 with ultraviolet curability is formed on the outer peripheral edge portion 52e. In the embodiment illustrated in FIG. 10, a UV curable adhesive in which a radical-polymerizable resin is used is used as the material of the adhesive layer 10. The adhesive layer 10 is formed on the whole surface of the outer peripheral edge portion 52e. As a method of forming the adhesive layer 10, a method of applying the UV curable adhesive onto the outer peripheral edge portion 52e by screen printing is used. In another example which is not illustrated, the adhesive layer 10 is formed in advance on the one side surface 52 of the membrane electrode assembly 5, and the cathode gas diffusion layer 3c is then formed.

Figure 11:
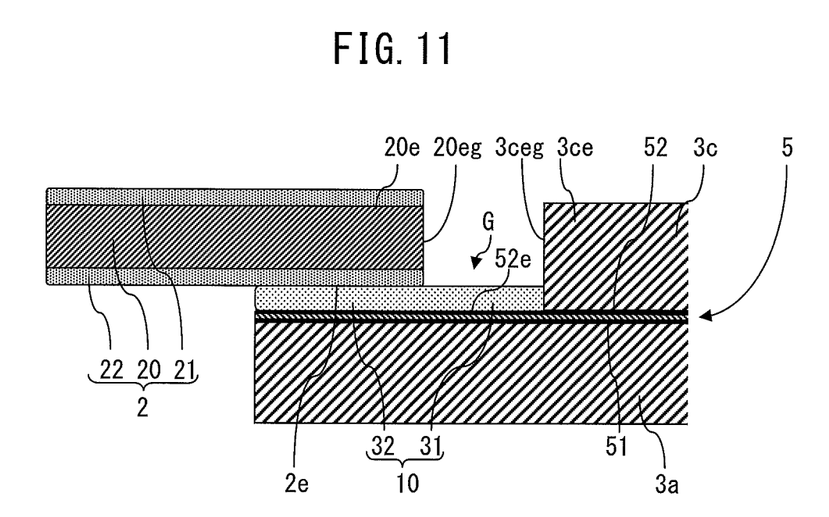
FIG. 11 is a partial cross-sectional view illustrating the steps of the method of manufacturing a single fuel cell.

Subsequently, the support frame 2 obtained in the step of FIG. 7 is provided as illustrated in FIG. 11. The support frame body 20 is formed of polyethylene terephthalate resin biaxially stretched as described above, and the biaxial stretching directions of the support frame body 20 are aligned in the longitudinal direction L1 and transverse direction L2 of the support frame 2, respectively. Subsequently, the support frame 2 is placed on the adhesive layer 10. In the embodiment illustrated in FIG. 11, the support frame 2 is placed at an appropriate position on the adhesive layer 10 so that an interior portion 2e of the support frame 2 comes into contact with an outer portion 32 of the adhesive layer 10 and the adhesive layer 10 is exposed partially. In other words, the support frame 2 is placed on the adhesive layer 10 so that the support frame 2 is spaced from the cathode gas diffusion layer 3c. Then, the support frame 2 is adhered to the adhesive layer 10 because the adhesive layer 10 has adhesiveness. In the other embodiment which is not illustrated, in which the sheet 2s for a support frame is cut so that the biaxial stretching directions intersect with the longitudinal direction L1 and the transverse direction L2, respectively, the biaxial stretching directions are allowed to intersect with the longitudinal direction L1 and transverse direction L2 of the support frame 2, respectively, when biaxially-stretched polyethylene naphthalate resin is placed.

Figure 12:
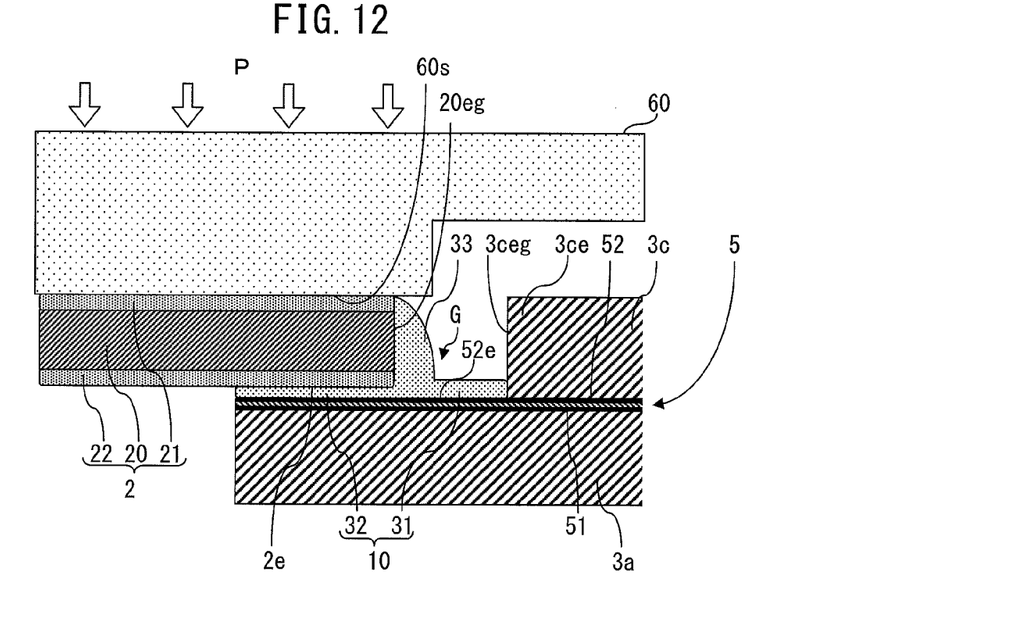
FIG. 12 is a partial cross-sectional view illustrating the steps of the method of manufacturing a single fuel cell.

Then, the support frame 2 and the membrane electrode assembly 5 are pressurized to relatively press each other as illustrated in FIG. 12. As a pressurization method, the support frame 2 is pressed on the adhesive layer 10 at a pressure P using a weight 60. Thus, the adhesive layer 10 underneath the support frame 2 is deformed, a part thereof moves toward the gap G, and the adhesive protecting layer 33 which covers the end 20eg of the support frame body 20 is formed. The adhesive protecting layer 33 can be formed, e.g., by adjusting the thickness and pressure P of the adhesive layer 10. In another embodiment which is not illustrated, the adhesive protecting layer 33 is formed in advance on the end 20eg of the support frame body 20 using an adhesive identical to or different from the adhesive layer 10. In such a case, it is not needed to perform the pressurization.

Figure 13:
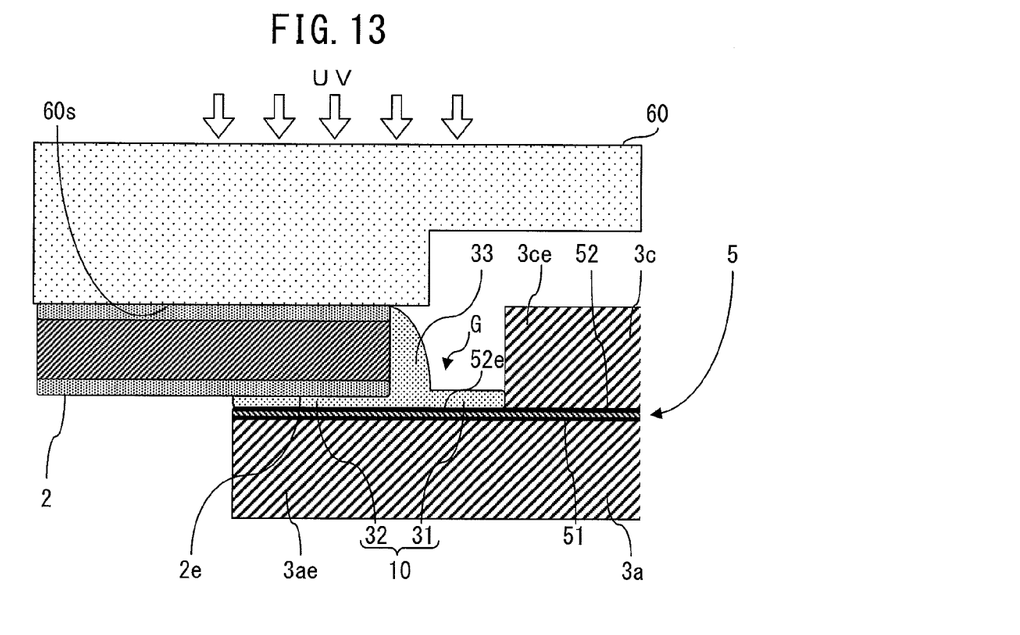
FIG. 13 is a partial cross-sectional view illustrating the steps of the method of manufacturing a single fuel cell.

Subsequently, the support frame 2 is irradiated with ultraviolet rays UV having predetermined wavelengths (e.g., 365 nm) while continuing the pressurization at the pressure P as illustrated in FIG. 13. Then, the adhesive layer 10 is cured by receiving the ultraviolet rays because the weight 60 is made of quartz and can transmit ultraviolet rays UV having predetermined wavelengths, and the polyethylene terephthalate resin of the support frame body 20 can also transmit ultraviolet rays UV having predetermined wavelengths. Irradiation conditions (e.g., intensity of ultraviolet rays, irradiation time, and the like) are selected as appropriate depending on the material of the adhesive layer 10. Thus, the outer portion 32 of the adhesive layer 10 and the interior portion 2e of the support frame 2 are adhered to each other, and the outer portion 32 of the adhesive layer 10 and the outer peripheral edge portion 52e of the membrane electrode assembly 5 are adhered to each other. As a result, the support frame 2 and the membrane electrode assembly 5 are adhered to each other via the adhesive layer 10.

In addition, the pressurization at the pressure P can result in more adhesion of the support frame 2 to the adhesive layer 10, to improve adhesive strength. A surface 60s where the support frame 2 and the weight 60 come into contact with each other is coated with a material such as Teflon (registered trademark), whereby the adhesive coating layer 21 is prevented from adhering to the surface 60s of the weight 60 even when the adhesive coating layer 21 melts. In another embodiment which is not illustrated, the support frame 2 is irradiated with ultraviolet rays without pressurizing the support frame 2 and the membrane electrode assembly 5.

Figure 14:
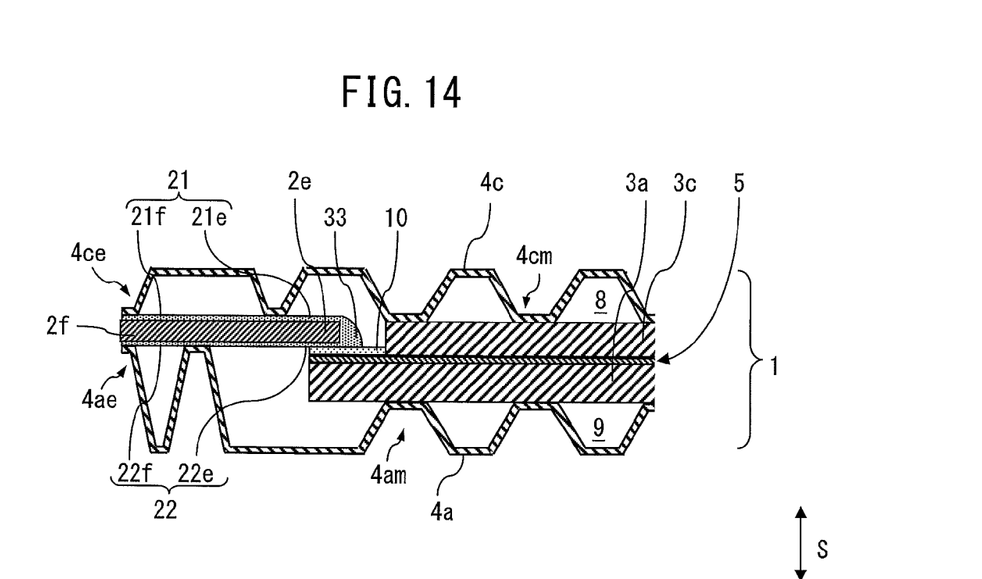
FIG. 14 is a partial cross-sectional view illustrating the steps of the method of manufacturing a single fuel cell.

Then, as illustrated in FIG. 14, the anode separator 4a is placed so that an outer portion 22f reverse to the interior portion 22e coming into contact with the adhesive layer 10 in the adhesive coating layer 22 on the one side surface of the support frame 2 comes into contact with the peripheral portion 4ae of the anode separator 4a. In addition, the cathode separator 4c is placed so that an outer portion 21f in the adhesive coating layer 21 on the other side surface of the support frame 2 comes into contact with the peripheral portion 4ce of the cathode separator 4c. Then, an outer portion 2f of the support frame 2 is heated mainly. Thus, the outer portion 22f and the outer portion 21f in the adhesive coating layer 22 and the adhesive coating layer 21 on the both side surfaces of the support frame 2 are mainly melted to adhere the peripheral portion 4ae of the anode separator 4a and the peripheral portion 4ce of the cathode separator 4c, and the support frame 2 to each other. As a result, the membrane electrode assembly 5 and the support frame 2 are sandwiched between a pair of the anode separator 4a and the cathode separator 4c. Then, the adhesive coating layers 22 and 21 cool off and cure to integrate the membrane electrode assembly 5, the cathode gas diffusion layer 3c, the anode gas diffusion layer 3a, the support frame 2, the anode separator 4a, and the cathode separator 4c.

The single fuel cell 1 is formed in the above steps.

In the manufacturing method of the present embodiment, the end 20eg of the support frame body 20 is protected by the adhesive protecting layer 33. As illustrated in FIG. 4, the end 20eg of the support frame body 20 is exposed to a strongly oxidative atmosphere in the cathode electrocatalyst layer 5c side of the single fuel cell 1. In particular, the gap G is present between the support frame 2 and the cathode gas diffusion layer 3c, and therefore, a strongly acidic aqueous solution may collect in the gap G and may greatly damage the end 20eg. However, because the end 20eg is protected by the adhesive protecting layer 33, the support frame body 20 is prevented from being exposed to an oxidative atmosphere to enable the support frame body 20 to be prevented from degrading even when the material of the support frame body 20 is a material vulnerable to an oxidative atmosphere in the cathode electrocatalyst layer 5c side.

In the manufacturing method of the present embodiment, a biaxially-stretched crystalline polymer is used as the material of the support frame body 20, and the biaxial stretching directions are aligned in the longitudinal direction L1 and transverse direction L2 of the support frame 2, respectively. Thus, the linear expansion coefficients of the support frame 2 in the longitudinal direction L1 and the transverse direction L2 can be allowed to be equivalent to each linear expansion coefficient of the cathode separator 4c and the anode separator 4a. Thus, the shrinkage of the support frame 2 and the shrinkage of both of the separators 4a and 4c in a subsequent cooling process or during cold operation can be allowed to be approximately equivalent to each other when the support frame 2 is heated to adhere the support frame 2 and both of the separators 4a and 4c to each other with the adhesive coating layers 21 and 22 with thermoplasticity. As a result, the tensile load that can act on the four sides of the membrane electrode assembly 5 due to the support frame 2 can be further lowered.

In the manufacturing method of the present embodiment, the biaxially-stretched crystalline polymer is used. However, a tri- or more multi-axially-stretched crystalline polymer (e.g., polyethylene terephthalate resin) can also be used as the material of the support frame body 20. In such a case, the linear expansion coefficients of the support frame body 20 in almost all directions are equivalent to the linear expansion coefficients of both of the separators 4c and 4a, and therefore, generation of cracks in the membrane electrode assembly 5 can be further inhibited. In addition, the alignment of one of the stretching directions in the longitudinal direction of the support frame 2 can allow the linear expansion coefficient of the support frame 2 in the longitudinal direction with a great shrinkage due to temperature change to be equivalent to each linear expansion coefficient of the cathode separator 4c and the anode separator 4a, and can result in further inhibition of generation of cracks in the membrane electrode assembly 5. In addition, since there are many stretching directions of the crystalline polymer, the flexibility of cutting in the case of cutting a film to form the support frame body 20 is increased to enable productivity to be improved.

Alternatively, a monoaxially-stretched crystalline polymer (e.g., polyethylene terephthalate resin) can also be used as the material of the support frame body 20. In such a case, the stretching direction is aligned in the longitudinal direction of the support frame 2. Thus, the linear expansion coefficient of the support frame 2 in the longitudinal direction with a great shrinkage due to temperature change can be allowed to be equivalent to each linear expansion coefficient of the cathode separator 4c and the anode separator 4a, and generation of cracks in the membrane electrode assembly 5 can be inhibited.

An adhesive which requires very little heating or requires no heating, rather than a thermoplastic adhesive which adheres at high temperature, can also be considered as a candidate for each material of the adhesive coating layers 21 and 22 with which the support frame 2 and both of the separators 4a and 4c are adhered. This is because the need for considering the linear expansion coefficient of an adherend is eliminated if heating is not performed. For example, a thermoplastic adhesive which adheres at a low temperature of around several tens of degrees that is slightly higher than room temperature (e.g., adhesive polyethylene resin) or a thermosetting adhesive (e.g., acrylic resin, epoxy resin, or polyisobutylene resin) can be considered as a candidate for the adhesive which hardly needs heating. However, because the adhesive strength of the thermoplastic adhesive which adheres at low temperature is decreased at a higher temperature than the adhesion temperature, it is difficult to use the thermoplastic adhesive in a single fuel cell for a vehicle which needs high-temperature operation. The thermosetting adhesive which cures at low temperature has a problem such as: poor handleability that means that it is impossible to manage the thermosetting adhesive at ordinary temperature; low productivity due to a long curing time; low acid resistance in the case of acrylic resin; induction of a decrease in the strength of an electrolyte membrane in the case of epoxy resin; or high viscosity in the case of polyisobutylene resin. Thus, it is difficult to use the thermosetting adhesive in a single fuel cell for a vehicle. An adhesive having ultraviolet curability can be considered as a candidate for the adhesive which needs no heating. However, it is difficult to use the ultraviolet curable adhesive because both of the separators 4a and 4c transmit no ultraviolet rays. Based on such reasons, in the single fuel cell for a vehicle, a thermoplastic adhesive which adheres at high temperature is used as each material of the adhesive coating layers 21 and 22 with which the support frame 2 and both of the separators 4a and 4c are adhered. Thus, materials of which the linear expansion coefficients are equivalent to each other are used as the materials of the support frame 2 and both of the separators 4a and 4c as described above.

In the manufacturing method of the present embodiment, an adhesive without any thermosetting property and with ultraviolet curability is used as the adhesive layer 10. When the adhesive that is hardly cured by heating but is cured by ultraviolet rays is used in such a manner, the need of heating time is eliminated because the adhesive is cured by ultraviolet irradiation without heating, and the time of the step of forming the adhesive layer 10 can be shortened to enable productivity to be improved because of a very short curing time. When the heating of the adhesive is needed, not only the adhesive but also a wide region including the membrane electrode assembly 5 and the support frame 2 in the neighborhood of the adhesive is heated, and damage to the membrane electrode assembly 5 can be caused by the difference between the linear expansion coefficients of the adhesive layer 10 and the membrane electrode assembly 5 in a cooling process after the heating. However, the damage can be inhibited because the need of the heating is eliminated. Further, when the heating of the adhesive is needed, the wide region is heated as described above, and warpage of the support frame 2 and the membrane electrode assembly 5 due to the difference between the linear expansion coefficients of the support frame 2 and the membrane electrode assembly 5 in the cooling process after the heating can occur. However, the warpage can be inhibited because the need of the heating is eliminated.

In the manufacturing method of the present embodiment, a situation in which the outer peripheral edge portion 52e of the membrane electrode assembly 5 is torn due to degradation or the like can be prevented because the outer peripheral edge portion 52e in the gap G between the support frame 2 and the cathode gas diffusion layer 3c is protected by the interior portion 31 of the adhesive layer 10 and is prevented from being exposed to the outside.

Next, referring to FIG. 15 to FIG. 17, another embodiment will be described. A manufacturing method of this the other embodiment differs from the above-described manufacturing method illustrated in FIG. 6 to FIG. 14 in view of forming the support frame body 20 with a material that hardly transmits ultraviolet rays with predetermined wavelengths (e.g., 365 nm) used for curing the adhesive layer 10 and of forming the adhesive layer 10 with an adhesive that is imparted with a thermosetting property and has ultraviolet curability. The differences will be mainly described below.

Examples of the material of the support frame body 20 include polyethylene naphthalate resin of a stretched crystalline polymer. The polyethylene naphthalate resin hardly transmits ultraviolet rays with predetermined wavelengths (e.g., 365 nm) used for curing the adhesive layer 10. Thus, the support frame 2 using such a material may be considered to be a material that is hard to transmit ultraviolet rays with predetermined wavelengths in view of a material that hardly transmits ultraviolet rays with predetermined wavelengths used for curing the adhesive layer 10. Examples of the material of the adhesive layer 10 used in such a case include a UV curable adhesive using a radical-polymerizable resin imparted with a thermosetting property or a UV curable adhesive using a cationic polymerizable resin imparted with a thermosetting property. Although UV curable adhesives are hardly cured by heat, a UV curable adhesive imparted with a thermosetting property is thermally cured. In the present embodiment, biaxially-stretched polyethylene naphthalate resin is used as the material of the support frame body 20, and a UV curable adhesive using a radical-polymerizable resin imparted with a thermosetting property is used as the material of the adhesive layer 10. In this other embodiment, the adhesive layer 10 is formed of an adhesive with tackiness when irradiated with ultraviolet rays and cured to such a degree that at least the shape of the adhesive layer can be maintained. As a method for imparting the adhesive layer 10 with tackiness, a method of preventing complete curing of the adhesive layer 10 by adjusting an irradiation time and an intensity of ultraviolet rays is used. In another embodiment which is not illustrated, a method of adding an accessory component such as a tackifying agent (tackifier) to the material of the adhesive layer 10 is used.

In the manufacturing method of this the other embodiment, first, the support frame 2 including the support frame body 20 with biaxially stretched polyethylene naphthalate resin is formed in advance as illustrated in FIG. 6 and FIG. 7. Then, as illustrated in FIG. 8 and FIG. 9, the membrane electrode assembly 5 is provided, and the cathode gas diffusion layer 3c is placed on the one side surface 52 of the membrane electrode assembly 5.

Figure 15:
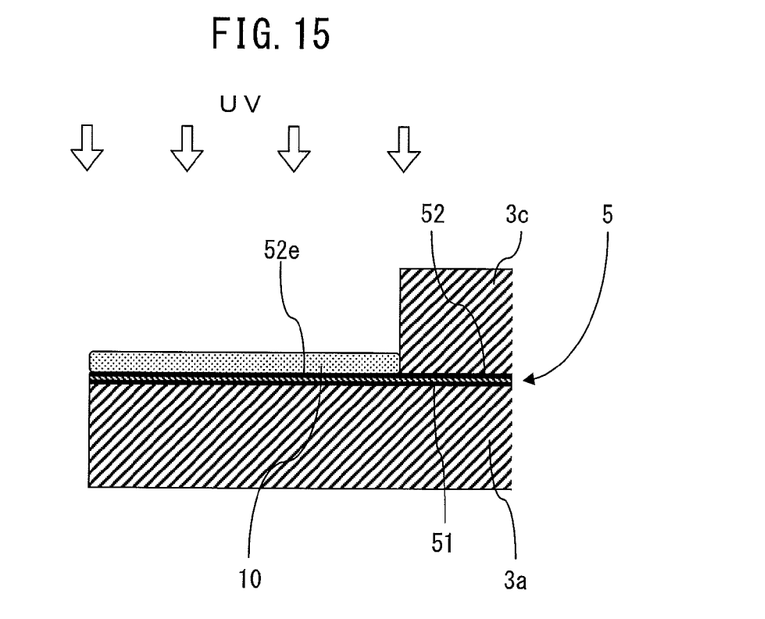
FIG. 15 is a partial cross-sectional view illustrating the steps of a method of manufacturing a single fuel cell of another embodiment.

Then, the adhesive layer 10 is formed on the outer peripheral edge portion 52e using a UV curable adhesive using a radical-polymerizable resin imparted with a thermosetting property, as illustrated in FIG. 15. Then, the adhesive layer 10 is irradiated with ultraviolet rays UV having with predetermined wavelengths (e.g., 365 nm) so that the adhesive layer 10 is adhered to the outer peripheral edge portion 52e of the membrane electrode assembly 5. The adhesive layer 10 is adhered to the membrane electrode assembly 5 due to ultraviolet curing caused mainly by ultraviolet rays, and protects the outer peripheral edge portion 52e. In the embodiment illustrated in FIG. 15, however, the adhesive layer 10 is prevented from being completely cured. Thus, the adhesive layer 10 is cured to such a degree that the shape of the adhesive layer 10 can be maintained and does not flow; however, the adhesive layer 10 has adhesiveness (tack strength), and can be deformed to some extent by applying relatively strong force to the adhesive layer 10. The conditions of irradiation with such ultraviolet rays UV (e.g., intensity of ultraviolet rays, irradiation time, and the like) are selected as appropriate depending on the material of the adhesive layer 10. In another embodiment which is not illustrated, a tackifying agent is added as an accessory component to the adhesive of the adhesive layer 10, whereby tack strength is exerted.

Figure 16:
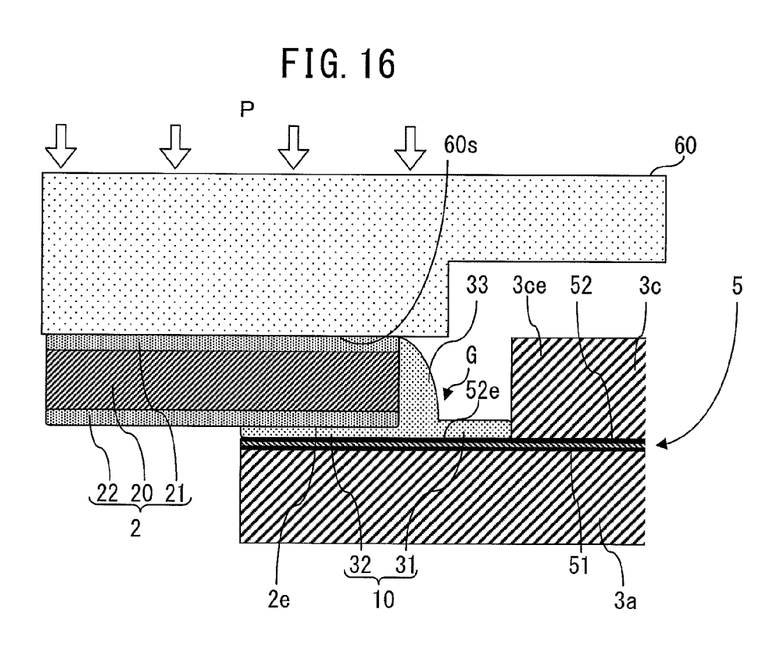
FIG. 16 is a partial cross-sectional view illustrating the steps of the method of manufacturing a single fuel cell of the other embodiment.

Subsequently, the support frame 2 is provided as illustrated in FIG. 16. In the embodiment illustrated in FIG. 16, biaxially-stretched polyethylene naphthalate resin is used as the material of the support frame body 20. Subsequently, the support frame 2 is placed on the adhesive layer 10. In the embodiment illustrated in FIG. 16, the support frame 2 and the membrane electrode assembly 5 are pressurized to relatively press each other. Then, the support frame 2 is adhered to the adhesive layer 10, held by the adhesive layer 10, and thereby temporarily fixed to the outer peripheral edge portion 52e of the membrane electrode assembly 5 because adhesiveness remains in the adhesive layer 10. Although the adhesive layer 10 is cured in such a degree that the shape of the adhesive layer 10 can be maintained, the adhesive layer 10 can be deformed to some extent by applying relatively strong force to the adhesive layer 10. Therefore, pressurization results in deformation of the adhesive layer 10, and allows part of the adhesive layer 10 to move toward the gap G, to form the adhesive protecting layer 33 which covers the end 20eg of the support frame body 20.

Figure 17:
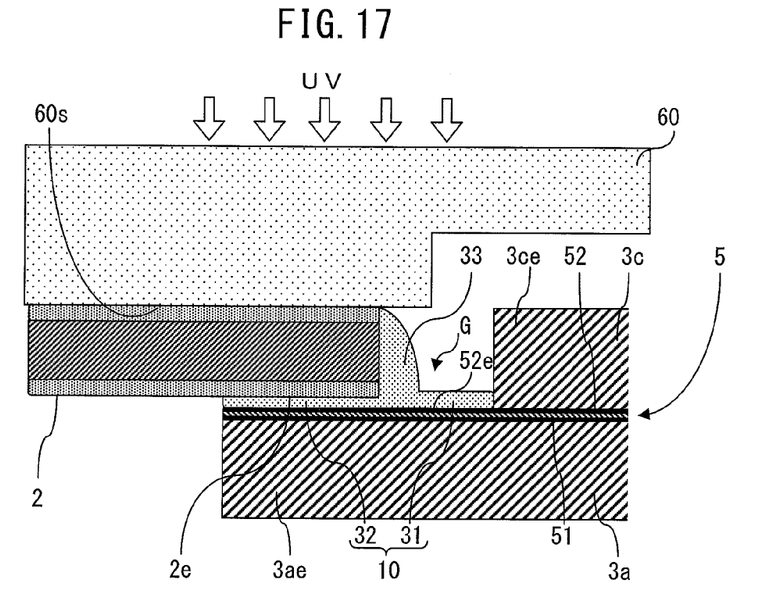
FIG. 17 is a partial cross-sectional view illustrating the steps of the method of manufacturing a single fuel cell of the other embodiment.

Subsequently, the support frame 2 is heated while continuing the pressurization at a pressure P as illustrated in FIG. 17. As a heating method, there is used a method of irradiating the support frame 2 with ultraviolet rays UV having predetermined wavelengths and allowing the support frame 2 to absorb the ultraviolet rays UV, whereby the support frame 2 generates heat by itself to heat the support frame 2. In such a case, the interior portion 2e in the support frame 2 is irradiated with ultraviolet rays UV having predetermined wavelengths so that the temperature of the interior portion 2e coming into contact with the adhesive layer 10 in the support frame 2 is not less than the temperature at which the adhesive layer 10 is cured. The conditions of such irradiation (e.g., intensity of ultraviolet rays, irradiation time, and the like) are selected as appropriate depending on the materials of the support frame 2 and the adhesive layer 10. Thus, the adhesive layer 10 underneath the interior portion 2e of support frame 2 starts to be thermally cured to thereby adhere the adhesive layer 10 and the support frame 2 to each other. The adhesive layer 10 is adhered to the support frame 2 by thermal curing caused mainly by heating. As a result, the support frame 2 and the membrane electrode assembly 5 are adhered to each other via the adhesive layer 10. The adhesive layer 10 that is not covered with the support frame 2 may also be irradiated with part of ultraviolet rays UV of which irradiation is performed toward the interior portion 2e of the support frame 2. In such a case, curing of the adhesive layer 10 that is not covered with the support frame 2 further proceeds due to ultraviolet rays UV. At that time, a portion that comes into contact with the support frame 2 in the adhesive protecting layer 33 is thermally cured while a portion that does not comes into contact with the support frame 2 in the adhesive protecting layer 33 is ultraviolet-cured. Thus, the support frame 2 and the membrane electrode assembly 5 are adhered via the adhesive layer 10.

Subsequently, as illustrated in FIG. 14, the cathode separator 4c and the anode separator 4a are placed on the both sides of the support frame 2 and the membrane electrode assembly 5, respectively.

The single fuel cell 1 is formed in the above steps.

In the manufacturing method of the present embodiment, there is adopted a method of imparting the ultraviolet curable adhesive of the adhesive layer 10 with a thermosetting property and allowing the support frame 2 to absorb ultraviolet rays to generate heat as a heat source for thermal curing. Thus, the adhesion between the adhesive layer 10 and the membrane electrode assembly 5 can be achieved by curing the adhesive layer 10 mainly due to ultraviolet irradiation as illustrated in the step of FIG. 15. In contrast, the adhesion between the adhesive layer 10 and the support frame 2 can be achieved by thermal curing mainly due to local heating as illustrated in the step of FIG. 17. In other words, the interior portion 2e can be locally heated to cure the adhesive layer 10 by irradiating the interior portion 2e coming into contact with the adhesive layer 10 in the support frame 2 with ultraviolet rays with the utilization of the use of the material that does not transmit ultraviolet rays as the material of the support frame 2 with advantage. In other words, the adhesive layer 10 needing to be heated can be locally heated without heating a wide region including the membrane electrode assembly 5 and the support frame 2 in the neighborhood of the adhesive layer 10. Thus, the adhesion of a portion that is not reached by ultraviolet rays can be enabled while making use of the advantage of using the ultraviolet curable adhesive described above.

In addition to the ultraviolet curable adhesive, an adhesive with thermoplasticity that adheres at a low temperature of around several tens of degrees that is slightly higher than room temperature (e.g., adhesive polyethylene resin) or an adhesive with a thermosetting property that is cured at low temperature (e.g., acrylic resin, epoxy resin, or polyisobutylene resin) can also be considered to be as a candidate for the material of the adhesive layer 10. However, it is difficult to use each adhesive in a single fuel cell for a vehicle in view of the problems of adhesive strength and manufacture described above. Based on the above, the ultraviolet curable adhesive imparted with a thermosetting property is used as the material of the adhesive layer 10 in the single fuel cell of a vehicle.

Even in such a case, an effect similar to that of the single fuel cell 1 obtained by the manufacturing method of the above-described embodiment illustrated in FIG. 6 to FIG. 14 can be offered.

In the above-described embodiment, the one side surface 52 (the side surface closer to the cathode gas diffusion layer 3c) of the membrane electrode assembly 5 is a cathode electrode side surface while the other side surface 51 (the side surface closer to the anode gas diffusion layer 3a) of the membrane electrode assembly 5 is an anode electrode side surface. In still another embodiment which is not illustrated, the one side surface of the membrane electrode assembly 5 is an anode electrode side surface while the other side surface of the membrane electrode assembly 5 is a cathode electrode side surface.

REFERENCE SIGNS LIST

1 Single fuel cell
2 Support frame
3a Anode gas diffusion layer
3c Cathode gas diffusion layer
5 Membrane electrode assembly
10 Adhesive layer
20 Support frame body
21 Adhesive coating layer
22 Adhesive coating layer
52e Outer peripheral edge portion

What is claimed is:

1. A single fuel cell, comprising:
a membrane electrode assembly including an electrolyte membrane and electrocatalyst layers formed on both side surfaces of the electrolyte membrane, respectively;
gas diffusion layers placed on both side surfaces of the membrane electrode assembly, respectively, so that an outer peripheral edge portion remains in one side surface of the membrane electrode assembly;
an adhesive layer formed to cover the outer peripheral edge portion; and
a support frame fixed on the adhesive layer,
wherein the support frame comprises:
a support frame body made of resin; and
coating layers formed to cover both side surfaces of the support frame body, respectively;
the support frame is fixed on the adhesive layer so that the support frame is spaced from the gas diffusion layer on the one side surface of the membrane electrode assembly; and
the single fuel cell further comprises a protecting layer formed to cover an end of an interior portion of the support frame body.

2. The single fuel cell according to claim 1, wherein the protecting layer is formed of a material identical to that of the adhesive layer.

3. The single fuel cell according to claim 1, wherein the support frame body is formed of polyethylene terephthalate resin or polyethylene naphthalate resin.

4. The single fuel cell according to claim 3, wherein
the adhesive layer is formed of an adhesive with ultraviolet curability; and
the support frame body is formed of polyethylene terephthalate resin.

5. The single fuel cell according to claim 1, wherein the one side surface of the membrane electrode assembly is a cathode electrode side surface.

6. A method of manufacturing a single fuel cell, the single fuel cell comprising: a membrane electrode assembly including an electrolyte membrane and electrocatalyst layers formed on both side surfaces of the electrolyte membrane, respectively; gas diffusion layers placed on both side surfaces of the membrane electrode assembly, respectively; and a support frame supporting the membrane electrode assembly on a periphery of the membrane electrode assembly, wherein the support frame comprises: a support frame body made of resin; and coating layers formed to cover both side surfaces of the support frame body, respectively;
the method of manufacturing the single fuel cell, comprising:
providing the membrane electrode assembly in which the gas diffusion layers are placed so that an outer peripheral edge portion remains in one side surface of the membrane electrode assembly;
forming an adhesive layer on the outer peripheral edge portion;
placing the support frame, in which an end of an interior portion of the support frame body is exposed, on the adhesive layer so that the support frame is spaced from the gas diffusion layer on the one side surface of the membrane electrode assembly;
relatively pressing the support frame on the adhesive layer; and
curing the adhesive layer,
wherein in the step of relatively pressing the support frame on the adhesive layer, the end of the interior portion of the support frame body is covered with a part of the adhesive layer, whereby a protecting layer is formed.

7. The method of manufacturing a single fuel cell according to claim 6, wherein the support frame body is formed of polyethylene terephthalate resin or polyethylene naphthalate resin.

8. The method of manufacturing a single fuel cell according to claim 7, wherein
- in the step of forming the adhesive layer, the adhesive layer is formed of an adhesive with ultraviolet curability, and
- the support frame body is formed of polyethylene terephthalate resin.

9. The method of manufacturing a single fuel cell according to claim 6, wherein
- the one side surface of the membrane electrode assembly is a cathode electrode side surface.

* * * * *